United States Patent Office

Re. 26,502
Reissued Dec. 10, 1968

26,502

PROCESS FOR PRODUCING A HIGH PROTEIN COMPOSITION BY CULTIVATING MICROORGANISMS ON AN N-ALIPHATIC HYDROCARBON FEED

John D. Douros, Jr., Littleton, Colo., assignor to Esso Research and Engineering Company, a corporation of Delaware No Drawing. Original No. 3,308,035, dated Mar. 7, 1967, Ser. No. 410,299, Nov. 10, 1964. Application for reissue Apr. 4, 1967, Ser. No. 637,018
11 Claims. (Cl. 195—28)

Matter enclosed in heavy brackets [ ] appears in the original patent but forms no part of this reissue specification; matter printed in italics indicates the additions made by reissue.

*ABSTRACT OF THE DISCLOSURE*

*Fermentation process for producing a high protein composition on an aliphatic hydrocarbon feed in a media comprising aqueous growth medium containing oxygen and other essential cell nutrients.*

This invention is directed to a method for biosynthesis of any of eight certain microorganisms having an unusually advantageous combination of properties, and the compositions of matter containing any one or more of these microorganisms in the non-viable state, especially as animal feed supplements, protein glues, adhesives, etc.

The eight microorganisms whose use is contemplated in this invention are tabulated hereinbelow along with their corresponding A.T.C.C. registration numbers, which were secured by depositing samples with the American Type Culture Collection in Washington, D. C.

| Microorganism name: | A.T.C.C. number |
|---|---|
| Pseudomonas ligustri | 15522 |
| Pseudomonas pseudomallei | 15523 |
| Pseudomonas orvilla | 15524 |
| Alcaligenes sp. | 15525 |
| Cellumonas galba | 15526 |
| Brevibacterium inspectiphilium | 15528 |
| Corynebacterium sp. | 15529 |
| Corynebacterium pourometabolum | 15530 |

The bacteriological characteristics of these microorganisms as determined by the below indicated tests leading to the above nomenclature are as follows:

NOMENCLATURE TESTS

| | Tests, A.T.C.C. No. | | | |
|---|---|---|---|---|
| | 15522 | 15523 | 15524 | 15525 |
| Morphology | Small gram negative rod | Small, thin gram negative rod. | Small, thin gram negative rod. | Small gram negative rod. |
| Motility | + (Motile) | + | + | − (Immotile). |
| Gram Reaction | − (Negative) | − | − | −. |
| Agar Colony Morphology | Opalescent, filamentous, radiated surface, ridged, rhizoid. | Raised entire edge, rough surface, glistening, butyrous. | Raised, rough, circular, undulate opaque, viscid. | Rough, circular, sl. elevated edge undulate, opaque, membranous. |
| Carbonhydrate Fermentation | + on starch and glucose | + on glucose only | + on glucose only | + on glucose, − on starch, lactose, sucrose, mannitol. |
| Pigmentation | Green on tryptose, brown on nutrient agar, white on potato, echinulate. | White on potato, nutrient agar and tryptose, on dextrose (produces green pigment). | White on all media filiform. | White on potato green on tryptose. |
| Gelatin Liquefaction | + | + | − | −. |
| Growth Temperature (° C.) | 30° (37°, 42°) | 30° (37°, 42°) | 30° (37°) | 30° (37°). |
| Growth pH | 5.5–7.5 | 5.5–8 | 5.5–9 | 4.0–9. |
| Urea Hydrolysis | − | + | − | +. |
| Sulfide Production | − | − | − | −. |
| Catalase Production | + | + | − | +. |
| Nitrate Reduction | − | − | − | −. |
| Oxygen | Aerobe | Aerobe | Aerobe | Aerobe. |
| Source | Soil | Soil | Soil | Soil. |
| Habitat | Soil-hydrocarbons | Soil-hydrocarbons | Soil-hydrocarbons | Soil-hydrocarbons. |

NOMENCLATURE TESTS

| | Tests, A.T.C.C. No. | | | |
|---|---|---|---|---|
| | 15526 | 15528 | 15529 | 15530 |
| Morphology | Small thin gram positive rod. | Small gram positive rod | Long rod some snapping | Pleomorphic gram positive rod, some bending. |
| Motility | + | − (Immotile) | − | −. |
| Gram Reaction | + (Positive) | + (Positive) | + | +. |
| Agar Colony Morphology | Lobate, flat, smooth opaque, membranous. | Lightish green raised smooth opaque. | Raised butyrous opaque | Convey entire edge creamy. |
| Carbonhydrate Fermentation | − on glucose, lactose, sucrose, starch and mannitol. | + on glucose, − on lactose, sucrose, starch and mannitol. | − (None fermented) | −. |
| Pigmentation | White on nutrient agar, yellow tryptone, white on potato. | White on dextrose, greenish on tryptone. | Cream on potato dextrose tryptone. | White on dextrose, cream on potato and tryptone. |
| Gelatin Liquefaction | + | + (Positive) | − | +. |
| Growth Temperature (° C.) | 30° | 30° | 32° | 32°. |
| Growth pH | 5.5–8 | 6–7.8 | 4–9 | 4–9. |
| Urea Hydrolysis | + (at 48 hours) | + (Positive) | + | |
| Sulfide Production | − | − (Negative) | − | |
| Catalase Production | + | + | + | |
| Nitrate Reduction | − | − | − | |
| Oxygen | Aerobe | Aerobe | Aerobe | Aerobe. |
| Source | Soil | Soil | Soil | Soil. |
| Habitat | Soil-hydrocarbons | Soil | Soil | Soil. |

Each of these eight microorganisms has a valuable composite of properties, viz., a high protein content in excess of 50 percent, an essential amino acid index in excess of 45 and an excellent amino acid profile, as will be more specifically indicated hereinafter. Moreover, said microorganisms are non-toxic and thus can be used in animal feed supplements. The protein can be extracted from these microorganisms by conventional extraction procedures and the protein extract then used as a glue or adhesive. A suitable protein extraction procedure involves sequential lysing, e.g., with acetone or other suitable organic lysing solvent, basic or acid extraction and isoelectric precipitation. Intracellular and/or extracellular amino acids can be isolated from the microorganism cells and/or fermentation media. In this regard the process of the present invention can be visualized as a combined process for biosynthesis of cells and chemicals.

The process of this invention is conducted by cultivating (fermenting) any of the aforesaid microorganisms on an aliphatic hydrocarbon feed source, e.g. a $C_1$–$C_{30}$ n-paraffin feed in an aqueous growth medium containing available oxygen and other essential cell nutrients for said microorganisms thereby producing and accumulating said microorganisms, and thereafter isolating said microorganism cells. If these cells are to form part of an animal feed supplement, the cells are usually rendered nonviable before use.

The present world shortage of protein is well known. In an attempt to alleviate this protein shortage recently there have been developed biosynthesis procedures whereby protein can be provided by the growth of bacteria on various carbon-containing substrate materials. One known technique of protein biosynthesis involves growing yeast on carbohydrate substrates. However, most of these biosyntheses require expensive vitamins and/or other growth mediums in addition to the comparatively expensive carbohydrate feeds in order to attain the desired microbial cell growth.

Another recent technique for biologically synthesizing protein, but in very small yield is the culture of microorganisms on petroleum substrates to produce esters and chemicals as a major product and microbe cells as a byproduct in very small amounts. This latter type of protein synthesis usually involves the use of less expensive carbon-containing feed materials, e.g., hydrocarbons rather than carbohydrates; but has not attained wide acceptance due to the difficulty of securing microbe cells having a high protein content coupled with a sufficiently high essential amino acid index. Other problems frequently connected with biosyntheses using hydrocarbon feed stocks are low cell growth rates (extremely long residence times) and inability of the microbe cells to effectively utilize hydrocarbon feeds for growth and reproduction.

The process of the present invention constitutes a marked improvement in protein biosynthesis by securing productive growth of the aforesaid microorganisms having a valuable combination of properties, in good yield at attractive growth rates, while using comparatively inexpensive $C_1$–$C_{30}$ aliphatic hydrocarbon feeds, e.g., $C_1$–$C_{30}$ n-paraffins, $C_6$–$C_{30}$ olefins, etc., for microbial growth. Moreover, the microorganisms contemplated herein can be isolated readily from the biosynthesis bath in which they are grown thus further enhancing the economic merits of the present invention.

For the culture medium in which the microbiological cells having the above-mentioned high protein content and high essential amino acid index are reproduced and accumulated in accordance with this invention, $C_1$ to $C_{30}$ n-aliphatic hydrocarbons can be used as the chief source of carbon and hydrogen for cell growth. Usually, however, the source of carbon will be $C_6$ to $C_{30}$ n-parafins, e.g., $C_6$ to $C_{10}$ light naphthas (viz., low boiling hydrocarbon oils of the $C_nH_{2n+2}$ series and having a boiling point between 95 and about 150° C.) and petroleum fractions containing them, and $C_{11}$ to $C_{30}$ gas oils boiling in the range of about 190° to 320° C., and petroleum fractions containing them. The preferred n-paraffin feed for the microbes contemplated herein are the $C_{11}$ to $C_{30}$ n-paraffins. Each of the above feeds can and frequently does contain normal olefins, e.g., $C_6$–$C_{20}$ mono and polyolefins, in varying amounts, e.g., from 0.05 to 30.0 percent by weight (based on total hydrocarbons in the feed).

Polycyclic aromatic compounds are usually excluded from the feed as such materials are considered to be possibly carcinogenic and could contaminate the harvested cells in feeds.

While the presence of branched aliphatic hydrocarbons (including both olefins and alkanes) in concentrations up to 30 wt. percent can be tolerated in the hydrocarbon feed; concentrations in excess of 10 wt. percent of non-normal aliphatic hydrocarbons are usually avoided because the aforesaid microorganisms are selective preferentially to normal aliphatic hydrocarbons, especially $C_{11}$–$C_{30}$ n-aliphatic hydrocarbons.

Oxygen can be supplied to the cultivation medium in any form capable of being assimilated readily by the inoculant microorganism, and oxygen-containing compounds can be used as long as they do not adversely affact microorganism cell growth and conversion of hydrocarbon feed to microorganism cells. Conveniently, however, the oxygen is supplied as an oxygen-containing gas, e.g., air, which contains from 19 to 22 wt. percent oxygen. While it is preferable to employ air, oxygen enriched air having more than 22 wt. percent oxygen, e.g., enriched air having in excess of 22 wt. percent oxygen, can be used.

Nitrogen is essential to biosynthesis. The source of nitrogen can be any organic or inorganic nitrogen-containing compound which is capable of releasing nitrogen in a form suitable for metabolic utilization by the microorganism(s) being harvested. In the organic category, the following compounds can be listed as exemplary nitrogen-containing compounds which can be used; proteins, acid-hydrolyzed proteins, enzyme-digested proteins, amino acids, yeast extract, asparagine, urea, etc., which materials are utilized as carbon sources also. For reasons of economy, it is usually preferable to employ inorganic nitrogen compounds, such as: ammonia, ammonium hydroxide, or salts thereof, such as ammonium citrate, ammonium sulfate, ammonium phosphate, ammonium acid phosphate, etc. A very convenient and satisfactory method of supplying nitrogen is to employ ammonium phosphate or ammonium acid phosphate, which can be added as the salt, per se, or can be produced in situ in the aqueous fermentation media by bubbling nascent nitrogen through the broth to which phosphoric acid was previously added, thereby forming ammonium acid phosphate.

In addition to the energy and nitrogen sources, it is necessary to supply requisite amounts of selected mineral nutrients in the feed medium in order to insure proper microorganism growth and maximize selectivity, viz., the conversion of hydrocarbons to microorganism cells. Thus, potassium, sodium, iron, magnesium, calcium, manganese, phosphorous, and other nutrients are included in the aqueous growth medium. These necessary materials can be supplied in form of their salts, and preferably their water-soluble salts. For example, the potassium can be supplied as potassium chloride, phosphate, sulfate, citrate, acetate, nitrate, etc. Iron and phosphorus can be supplied in the form of sulfates and phosphates, respectively, e.g., iron sulfate, iron phosphate. Usually most of the phosphorus is supplied as ammonia phosphates. When either ammonium phosphate or ammonium acid phosphate is used, it can serve as a combined source of both nitrogen and phosphorus (phosphate ion) for microorganism cell growth. Generally the compositional content of the fermentation growth media at the outset of fermentation is as follows:

| Component | Concentration (Grams per Liter) | | |
|---|---|---|---|
| | Can Use | Usually Use | Preferably Use |
| $C_{11}$–$C_{30}$ n-aliphatic hydrocarbon | 4–120 | 5–80 | 10–50 |
| $K_2HPO_4$ | 0.5–15 | 1–10 | 2–8 |
| $(NH_4)_2HPO_4$ | 5–15 | 7–13 | 8–12 |
| $Na_2SO_4$ | 0.1–1.0 | 0.2–0.9 | 0.3–0.8 |
| $FeSO_4 \cdot 7H_2O$ | 0.002–0.05 | 0.005–0.04 | 0.01–0.03 |
| $MgSO_4 \cdot 7H_2O$ | 0.1–0.7 | 0.2–0.6 | 0.3–0.5 |
| $MnSO_4 \cdot 4H_2O$ | 0.002–0.05 | 0.005–0.04 | 0.01–0.03 |
| NaCl | 0.002–0.05 | 0.005–0.04 | 0.01–0.03 |
| Water | Remainder to equal 100 wt. percent | | |

Other optional mineral nutrients which can be included in trace amounts include:

| Component | Concentration (Milligrams per Liter) | | |
|---|---|---|---|
| | Can Use | Usually Use | Preferably Use |
| $ZnSO_4 \cdot H_2O$ | 0–0.4 | 0–0.3 | 0–0.2 |
| $Na_2MoO_4 \cdot 2H_2O$ | 0–0.06 | 0–0.05 | 0–0.04 |
| $CoCl_2$ | 0–1.2 | 0–1.1 | 0–1.2 |
| $H_3BO_3$ | 0–0.08 | 0–0.07 | 0–0.06 |
| $CuSO_4 \cdot 5H_2O$ | 0–0.3 | 0–0.25 | 0–0.2 |
| $CaCl_2 \cdot 6H_2O$ | 0–0.14 | 0–0.13 | 0–0.12 |
| $NiCl_2 \cdot 6H_2O$ | 0–0.01 | 0–0.008 | 0–0.006 |

Of course, the essential and optional nutrients can be supplied in the form of other salts than those tabulated hereinabove.

The temperature of the culture during biosynthesis can be varied from about 20 to about 55° C. depending upon the specific microorganism being grown, but usually temperatures of from about 20 to 45° C. are employed. Preferably the fermentation is conducted at temperatures ranging from about 25 to 40° C. According to the present invention cultivation is conducted in a medium as described above by adding an inoculum of the microorganism to be harvested to the fermentation media containing the n-aliphatic hydrocarbon feed source and regulating the pH usually from about 6 to about 8 while maintaining proper growth temperatures under shaking or stirring while utilizing aeration in submerged condition. If the pH becomes too high for optimum growth of the microorganism to be harvested, it can be lowered readily to addition of a suitable acid to the fermentation media, e.g., HCl. In like manner if the pH becomes too low, it can be raised by addition of a suitable base, e.g., ammonia or ammonium hydroxide.

At the start-up of the fermentation the growth medium is inoculated with the microorganism to be harvested, e.g., by use of a previously cultivated inoculum in the same media in which it is to be grown, e.g., as described above. The initial concentration of inoculum containing said microorganism at the outset of fermentation can vary widely, e.g., 0.0005 to 50.0 grams per liter of total fermentation media. Other inoculation procedures can be employed, e.g., use of an inoculum where said microorganism is previously grown on a media different from that in which the fermentation is to be conducted and then transferred to the fermentation vessel(s) etc.

At the end of fermentation, the cells are isolated from the fermentation media by decantation, filtration (with or without filter aids), centrifugation, etc.

The filtered cells can then be dewatered, e.g., using rotary drum dryers, spray dryers, etc., although this is not absolutely necessary. The cells are usually rendered non-viable before use by spray drying at 150–185° C. for from 2–30 seconds. Care should be exercised during pasteurization to avoid extreme temperatures for extended time periods when the harvested cells are to be used as protein supplement (in order to avoid protein degradation).

If the cells are to be used in making glues, adhesives, etc., it is not necessary to render them non-viable as the protein extraction procedures suffice. The same is true when the microorganism cells are grown and harvested for their intracellular chemicals, e.g., amino acid, content.

The present invention will be illustrated in greater detail by the examples which follow, but these examples should not be construed as limiting the scope thereof.

EXAMPLE 1

A growth medium of the following composition was prepared:

| Component: | Concentration (grams liter) |
|---|---|
| n-Hexadecane [1] | 20.0 |
| $K_2HPO_4$ | 5.0 |
| $(NH_4)_2HPO_4$ | 10.0 |
| $Na_2SO_4$ | 0.5 |
| $MgSO_4 \cdot 7H_2O$ | 0.4 |
| $FeSO_4 \cdot H_2O$ | 0.02 |
| $MnSO_4 \cdot 4H_2O$ | 0.02 |
| NaCl | 0.02 |
| Water (sufficient to make a volume of 100 mls.). | |

[1] Commercial n-hexadecane containing <1 wt. percent $C_{16}$ n-monoolefin.

After regulating the pH to 7.2 to 7.7, the above media was introduced into a 500 ml. Erlenmeyer flask, and the flask contents were sterilized by heating at 121° C. for 15 minutes. Then approximately 0.001 gram per liter of Brevibacterium insectiphilium (A.T.C.C. No. 15528), previously cultured for 48 hours at 30° C. on the same medium, was inoculated into the fermentation growth medium. The fermentation media was cultured under shaking at 30° C. for 48 hours maintaining the growth pH between 6 and 7.5 throughout fermentation.

After 48 hours, the cell concentration was 6.2 grams per liter, and 40 wt. percent of the n-hexadecane aliphatic hydrocarbon feed was utilized by the microorganism (cell yield of 77.5 percent based on aliphatic hydrocarbon utilized). After the completion of fermentation, the broth was centrifuged and then sterilized in a spray drier at 180° C. for 4 seconds.

EXAMPLE 2

Corynebacterium sp. (A.T.C.C. No. 15529) was fermented for 48 hours at 30° C. using the same growth medium and procedure set forth in Example 1 with the exception that 10 grams per liter of n-hexadecane was used in this fermentation. After 48 hours, the cell growth was 9.5 grams per liter and 100 percent of the n-hexadecane hydrocarbon feed was utilized (cell yield of 95 percent based on aliphatic hydrocarbon utilized).

EXAMPLE 3

Corynebacterium pourometabolum (A.T.C.C. No. 15530) was grown for 48 hours at 30° C. at a pH of 6 to 7 in accordance with the procedure of Example 1 and using the growth medium thereof, but with an n-hexadecane concentration of 17 grams per liter. After 48 hours the cell growth was 12.8 grams per liter and 100 percent of the n-aliphatic hydrocarbon feed was utilized (cell yield of 75 percent based on n-hexadecane utilized).

EXAMPLE 4

Pseudomonas ligustri (A.T.C.C. No. 15522) was grown for 48 hours at 30° C. at a pH of approximately 7.8 under the procedure of Example 1 only using 17 grams per liter of n-hexadecane. After 48 hours, the cell growth was 9 grams per liter and 99.9 percent of the n-hexadecane was utilized by the microorganism (cell yield of approximately 51 percent based on utilized n-aliphatic hydrocarbon feed).

EXAMPLE 5

Pseudomonas pseudomallei (A.T.C.C. No. 15523) was grown for 48 hours at 30° C. at a pH range of 7 to 8 as in Example 1, but using 17 grams per liter of n-hexadecane. After 48 hours, the cell growth was 6 grams per liter and 52 percent of the n-hexadecane was utilized (cell yield of 70.7 percent based on n-aliphatic hydrocarbon feed utilized).

EXAMPLE 6

Pseudomonas orvilla (A.T.C.C. No. 15524) was grown for 48 hours at 30° C. as in Example 1, but with an n-aliphatic hydrocarbon (n-hexadecane) concentration of 17 grams per liter in the fermentation growth medium. After 48 hours the cell growth was 5.5 grams per liter and 52 percent of the n-aliphatic hydrocarbon feed was utilized (cell yield of 62.5 percent based on n-hexadecane utilized).

EXAMPLE 7

Alcaligenes sp. (A.T.C.C. No. 15525) was grown for 48 hours at 30° C. as in Example 1, but using 17 grams per liter of n-hexadecane n-aliphatic hydrocarbon feed in the growth medium. After 48 hours the cells were harvested revealing a cell growth of 3 grams per liter and an 80 percent by weight n-hexadecane utilization (cell yield of 22 percent based on utilized n-aliphatic hydrocarbon feed).

EXAMPLE 8

Cellumonas galba (A.T.C.C. No. 15526) was grown for 48 hours at 30° C. as in Example 1, but using 17 grams per liter of n-hexadecane feed in the aqueous growth medium. After 48 hours the cell growth level was 6.3 grams per liter and 51 percent of the n-aliphatic hydrocarbon feed was utilized (cell yield of 77 percent based on n-aliphatic hydrocarbon feed utilized by the microorganism).

EXAMPLE 9

The protein content, essential amino acid index and amino acid profile of the eight microorganisms grown and harvested in Examples 1–8 were determined using the customary analytical procedures and calculations.

The protein content (expressed as a percent) is calculated from the determined weight percent nitrogen (as determined by the Kjeldahl method) of the cells by multiplying by a factor of 6.25.

The essential amino acid index of the harvested cells is determined using the conventional method employing egg as a basis for comparison. Egg is considered as a perfect protein having an essential amino acid index of 100.0.

In determining the amino acid profiles of the harvested cells, chromatographic analysis was used to determine all listed components with the exception of tryptophan which was determined by microbiological assay.

The protein contents and essential amino acid indexes (E.A.A. Index) for the harvested cells are indicated below in Table 1, and the amino acid profiles are shown in Table 2.

TABLE 1

| Example | Harvested Cells | Protein Content (Percent Protein) | E.A.A. Index |
|---|---|---|---|
| 1 | Brevibacterium insectiphilium (A.T.C.C. No. 15528). | 53.6 | 60 |
| 2 | Corynebacterium sp. (A.T.C.C. No. 15529). | 69.0 | 58 |
| 3 | Corynebacterium pourometabolum (A.T.C.C. No. 15530). | 59.6 | 63.3 |
| 4 | Pseudomonas ligustri (A.T.C.C. No. 15522). | 60.9 | 46.8 |
| 5 | Pseudomonas pseudomallei (A.T.C.C. No. 15523). | 56.8 | 58.2 |
| 6 | Pseudomonas orvilla (A.T.C.C. No. 15524). | 62.0 | 63.0 |
| 7 | Alcaligenes sp. (A.T.C.C. No. 15525). | 70.0 | 74.1 |
| 8 | Cellumonas galba (A.T.C.C. No. 15526). | 51.4 | 65.9 |

TABLE 2 (AMINO ACID PROFILE)

| Essential Amino Acid | Wt. percent of Amino Acid in Harvested Cells from Example Number— | | | | | | | |
|---|---|---|---|---|---|---|---|---|
| | 1 | 2 | 3 | 4 | 5 | 6 | 7 | 8 |
| Arginine | 2.72 | 2.6 | 3.0 | 2.4 | 2.9 | 3.1 | 4.1 | 3.0 |
| Glycine | 2.0 | 3.0 | 2.4 | 2.0 | 2.1 | 2.1 | 3.0 | 2.6 |
| Isoleucine | 2.3 | 3.0 | 3.4 | 1.1 | 1.9 | 2.6 | 3.8 | 2.5 |
| Leucine | 3.5 | 4.2 | 3.7 | 3.3 | 3.4 | 3.4 | 4.8 | 3.0 |
| Methionine | 0.72 | 0.83 | 0.75 | 0.6 | 0.76 | 0.9 | 1.2 | 0.74 |
| Phenylalanine | 1.5 | 1.9 | 1.7 | 1.5 | 1.6 | 1.7 | 1.8 | 1.7 |
| Valine | 2.5 | 3.2 | 2.6 | 2.1 | 2.3 | 2.7 | 3.8 | 2.7 |
| Tryptophan | *N.D. | *N.D. | *N.D. | 1.6 | 0.68 | 1.12 | 1.0 | 1.2 |
| Lysine | 2.4 | 2.8 | 2.3 | 1.5 | 2.4 | 2.6 | 5.0 | 0.93 |

*N.D.=Not Determined.

As will be noted from the above data, each of the microorganisms harvested in accordance with this invention possess the valuable combination of a high protein content in excess of 50 percent, a high essential amino acid index in excess of 45 percent and a nutritionally attractive amino acid profile, thus further indicating the use of the present invention to harvest usable protein by biosynthesis in an extremely economic manner when using these eight microorganisms. Thus the present invention is especially useful in preparing animal feed supplements having significant protein and over-all nutritional value. When the harvested microorganism cells are employed as protein feed supplements, the harvested, non-viable cells of any two or more of said eight microorganisms can be blended with one another or other protein supplements to form a more perfect protein feed as will be noted in the below example.

EXAMPLE 10

Harvested cells of the various microorganisms noted below were blended (mixed) in the below indicated weight ratios. Then the nitrogen content, protein content (percent protein), E.A.A. Index and amino acid profile of these blends were determined as in Example 9. The pertinent data are tabulated hereinbelow with Table 3 showing the composition and weight proportion of the blends along with the nitrogen content, protein content and E.A.A. Index. Table 4 shows the amino acid profile for each blend.

TABLE 3

| Blend | Composition and (Weight Ratio) | Nitrogen Content (Wt. Percent Nitrogen) | Protein Content (Percent Protein) | E.A.A. Index |
|---|---|---|---|---|
| A | Ex. 4 and Ex. 5 (1:1). | 9.42 | 58.9 | 49.3 |
| B | Ex. 4 and Ex. 5 (2:1). | 9.53 | 59.6 | 50.7 |
| C | Ex. 4 and Ex. 8 (1:3). | 8.61 | 53.8 | 58.0 |
| D | Ex. 4 and Ex. 6 (1:1). | 9.84 | 61.5 | 50.4 |
| E | Ex. 1 and Ex. 6 (1:2). | 9.47 | 59.2 | 56.5 |
| F | Ex. 2 and Ex. 8 (1:1). | 9.62 | 60.12 | 57.7 |
| G | Ex. 2 and Ex. 4 (1:2). | 10.2 | 63.6 | 48.3 |
| H | Ex. 3 and Ex. 4 (1:3). | 9.7 | 60.6 | 47.1 |

TABLE 4 (AMINO ACID PROFILE)

| Essential Amino Acid | Wt. Percent of Amino Acid in Blend | | | | | | | |
|---|---|---|---|---|---|---|---|---|
| | A | B | C | D | E | F | G | H |
| Threonine | 2.8 | 2.7 | 3.1 | 2.9 | 3.0 | 3.3 | 2.9 | 2.9 |
| Glycine | 3.4 | 3.4 | 4.4 | 3.3 | 3.4 | 4.5 | 3.6 | 3.4 |
| Valine | 3.7 | 3.6 | 4.7 | 3.9 | 4.4 | 4.8 | 3.8 | 3.6 |
| Methionine | 1.1 | 1.0 | 1.3 | 1.2 | 1.4 | 1.3 | 1.0 | 1.0 |
| Isoleucine | 2.5 | 2.2 | 3.9 | 2.9 | 4.2 | 4.5 | 2.6 | 2.2 |
| Leucine | 5.6 | 5.5 | 5.7 | 5.4 | 5.7 | 5.9 | 5.6 | 5.5 |
| Tyrosine | 2.1 | 2.1 | 1.8 | 2.0 | 1.9 | 1.7 | 1.9 | 2.0 |
| Phenylalanine | 2.6 | 2.5 | 2.9 | 2.5 | 2.7 | 2.9 | 2.5 | 2.5 |
| Lysine | 3.2 | 2.9 | 4.3 | 3.3 | 4.2 | 4.5 | 3.0 | 2.7 |
| Histidine | 1.6 | 1.7 | 1.8 | 1.6 | 1.5 | 1.5 | 1.6 | 1.7 |
| Arginine | 4.5 | 4.3 | 5.2 | 4.5 | 5.0 | 4.6 | 3.9 | 4.2 |

Moreover, this invention also has a chemicals aspect in serving as a biosynthetic synthesis of intracellular and extracellular chemicals. In the latter respect it should be noted here that further experimental fermentation biosynthesis using the microorganisms of Example 7 (A.T.C.C. No. 15525) and Example 8 (A.T.C.C. No. 15526) respectively on fermentation growth mediums having 4–16% concentrations of n-aliphatic hydrocarbon (n-hexadecane) feed produced 1.109 grams per liter and 0.326 gram per liter, respectively, of extracellular amino acid mixtures. These fermentations were conducted at 30° C. under shaking for 72–144 hours in two stages with the first stage constituting a 24–48 hour growth on n-aliphatic hydrocarbon (to cell growth levels ranging from 0.8 to 9.4 grams per liter) followed by a 24–96 hour second stage at the same conditions in which varying amounts, viz., 6–10% of an n-alkylated benzene (n-amyl benzene) were added. The harvest of cells plus amino acids was performed subsequent to the addition of the n-alkylated benzene(s) or mixtures thereof.

While the above examples involve 48-hour fermentations, the fermentation period can be varied widely from about 30 minutes to continuous operation. Usually in batch fermentations to maximize cell yield and maintain an economically advantageous cell growth level, fermentation will be conducted for time periods ranging from 1 to 5 days and more preferably from 36 to 96 hours.

While the preceding examples illustrate the present invention in great detail, it should be remembered that the present invention in its broadest aspects is not necessarily limited to the specific materials and conditions shown in these examples.

What is claimed is:

1. A process for biosynthetically producing a high protein composition having a protein content in excess of 50 percent and an essential amino acid index in excess of 45 which comprises cultivating a microorganism selected from the group consisting of:

Pseudomonas ligustri (A.T.C.C. No. 15522),
Pseudomonas pseudomallei (A.T.C.C. No. 15523),
Pseudomonas orvilla (A.T.C.C. No. 15524),
Alcaligenes sp. (A.T.C.C. No. 15525),
Cellumonas galba (A.T.C.C. No. 15526),
Brevibacterium insectiphilium (A.T.C.C. No. 15528),
Corynebacterium sp. (A.T.C.C. No. 15529), and
Corynebacterium pourometabolum (A.T.C.C. No. 15530)

on an n-aliphatic hydrocarbon feed in a media comprising an aqueous growth medium containing oxygen and other essential cell nutrients at temperatures ranging from about 20° to 55° C., and harvesting by centrifuging and spray drying said microorganism cells.

2. A process according to claim 1 wherein said n-aliphatic hydrocarbon feed is a $C_1$–$C_{30}$ n-aliphatic hydrocarbon feed.

3. A process according to claim 1 wherein the concentration of said n-aliphatic hydrogen feed ranges from 4 to 120 grams per liter.

4. A process according to claim 1 wherein said cultivation is conducted batchwise for time periods ranging from about 24 to 120 hours.

5. A process according to claim 1 which includes heating said harvested cells at temperatures ranging from about 150° to about 185° C. to render them non-viable.

6. A process according to claim 1 wherein said aqueous growth medium includes the following components in the below tabulated concentrations—

| Component: | Concentration (gram/liter) |
|---|---|
| n-Aliphatic hydrocarbon | 4–120 |
| $K_2HPO_4$ | 0.5–15 |
| $(NH_4)_2HPO_4$ | 5–15 |
| $Na_2SO_4$ | 0.1–10 |
| $FeSO_4 \cdot 7H_2O$ | 0.002–0.05 |
| $MgSO_4 \cdot 7H_2O$ | 0.1–0.7 |
| $MnSO_4 \cdot 4H_2O$ | 0.002–0.05 |
| NaCl | 0.002–0.05 |

7. A process according to claim 1 wherein said n-aliphatic hydrocarbon feed is predominantly a $C_{11}$–$C_{30}$ n-paraffin.

*8. A process for biosynthetically producing a high protein composition having a protein content in excess of 50 percent and an essential amino acid index in excess of 45 which comprises cultivating a microorganism selected from the group consisting of:*

*Pseudomonas ligustri (A.T.C.C. No. 15522),*
*Pseudomonas pseudomallei (A.T.C.C. No. 15523),*
*Pseudomonas orvilla (A.T.C.C. No. 15524),*
*Alcaligenes sp. (A.T.C.C. 15525),*
*Cellumonas galba (A.T.C.C. No. 15526),*
*Brevibacterium insectiphilium (A.T.C.C. No. 15528),*
*Corynebacterium sp. (A.T.C.C. No. 15529), and*
*Corynebacterium pourometabolum (A.T.C.C. No. 15530)*

*on an n-aliphatic hydrocarbon feed in a media comprising an aqueous growth medium containing oxygen and other essential cell nutrients at temperatures ranging from about 20 to 55° C., and harvesting said microorganism cells.*

*9. Process as defined by claim 8 wherein said microorganism cells are harvested by decantation.*

*10. Process as defined by claim 8 wherein said microorganism cells are harvested by filtration.*

*11. A process according to claim 8 wherein said aqueous growth medium includes the following components in the below tabulated concentrations:*

| *Component:* | *Concentration (gram/liter)* |
|---|---|
| *n-Aliphatic hydrocarbon* | *4–120* |
| $K_2HPO_4$ | *0.5–15* |
| $(NH_4)_2HPO_4$ | *5–15* |
| $Na_2SO_4$ | *0.1–10* |
| $FeSO_4 \cdot 7H_2O$ | *0.002–0.05* |
| $MgSO_4 \cdot 7H_2O$ | *0.1–0.7* |
| $MnSO_4 \cdot 4H_2O$ | *0.002–0.05* |
| *NaCl* | *0.002–0.05* |

References Cited

The following references, cited by the Examiner, are of record in the patented file of this patent or the original patent.

UNITED STATES PATENTS

| | | | |
|---|---|---|---|
| 3,085,049 | 4/1963 | Rudy et al. | 195—80 |
| 3,222,258 | 12/1965 | Iizuka et al. | 195—29 |

LIONEL M. SHAPIRO, *Primary Examiner.*

U.S. Cl. X.R.

99—9